United States Patent [19]

McFarlan et al.

[11] Patent Number: 5,207,922

[45] Date of Patent: May 4, 1993

[54] METHOD FOR TREATING LAUNDRY WASTE WATER

[75] Inventors: James P. McFarlan, Ft. Thomas, Ky.; William H. Frisz, Cincinnati, Ohio

[73] Assignee: Diversey Corporation, Ontario, Canada

[21] Appl. No.: 603,796

[22] Filed: Oct. 25, 1990

[51] Int. Cl.⁵ .............................................. B01D 17/05
[52] U.S. Cl. ...................................... 210/708; 8/158; 68/18 R; 210/737; 210/804
[58] Field of Search ............... 210/708, 737, 742, 749, 210/766, 774, 799, 804, 167, 181, 919, 417; 8/141, 158; 68/18 R

[56] References Cited

U.S. PATENT DOCUMENTS

| | | | |
|---|---|---|---|
| 3,192,155 | 6/1965 | Bready et al. | 210/705 |
| 3,841,116 | 10/1974 | Klein et al. | 210/167 |
| 4,108,768 | 8/1978 | Sebelik et al. | 210/708 |
| 4,211,650 | 7/1980 | Thomas | 210/703 |
| 4,211,651 | 7/1980 | Thomas | 210/703 |
| 4,211,652 | 7/1980 | Thomas | 210/703 |
| 5,076,937 | 12/1991 | Montgomery | 210/705 |
| 5,097,556 | 3/1992 | Engel et al. | 8/158 |

FOREIGN PATENT DOCUMENTS 513237 10/1939 United Kingdom .............. 68/18 R

Primary Examiner—Peter Hruskoci
Attorney, Agent, or Firm—Wood, Herron & Evans

[57] ABSTRACT

A method is designed to treat the effluent from a commercial laundry facility. Commercial laundry facilities produce typically a relatively clean effluent produced by washing clothing, towels and the like. The same laundry facility can also produce an oily effluent from washing shop towels, mops and the like. The effluent produced by the commercial laundry is all subjected to a particulate filtration and heat exchanger. The nonoily effluent is then directed to the sanitary drain. The oily effluent is treated with a demulsifier to break down the oil/water emulsion and is subsequently transferred to a oil/water separator. This permits the capacity of the oil/water separator to be approximately ⅛ to ¼ of that which would be required to treat all effluent in the laundry.

7 Claims, 2 Drawing Sheets

METHOD FOR TREATING LAUNDRY WASTE WATER

BACKGROUND OF THE INVENTION

Industrial laundries clean a variety of different articles which produce different effluent. In typical industrial laundries, two-thirds to three-quarters of the laundry will be relatively easily cleaned articles such as clothing, linen, bath towels, etc. The remaining quarter to one-third of the laundry will be substantially dirtier articles, such as shop towels, mop heads, and so on. The effluent from these dirtier articles is, of course, substantially different and typically high in oil content.

All of the effluent from the laundry, however, must meet the same environmental standards in terms of oil and grease (0 & G), total suspended solids (TSS), chemical oxygen demand (COD), biological oxygen demand (BOD), and POTW.

With the nonoily effluent produced from washing clothing and the like, relatively little treatment is required to meet these requirements. Generally, filtering the total suspended solids using a shaker screen produces an effluent which is suitable for disposal directly to a sanitary sewer. However, this treatment is not effective for an oily effluent produced by washing shop towels and the like. Typically, the oily effluent from washing shop towels can include 500 to about 5000 ppm of oil. This must be reduced to about 100 ppm.

The treatment of the oily effluent creates a significant problem because the detergent acts by emulsifying the oil in water. Basically that is the purpose of the detergent. To remove the oil, one must demulsify the detergent which presents an even greater problem.

All effluent from the laundry must be treated to remove suspended solids. All effluents must also pass through a common heat exchanger. Treating all effluents in the same manner to remove suspended oil, however, is very expensive. Treating a larger quantity of effluent drastically increases capital costs.

SUMMARY OF THE INVENTION

The present invention is premised on the realization that the effluent from an industrial laundry can be inexpensively treated even where the majority of the effluent is a nonoily, relatively clean effluent and a relatively smaller portion is difficult to treat oily effluent. The present invention provides a combination of common treatment portions and separate treatment portions. The relatively clean effluent passes only through the common treatment portions. The oily effluent is then directed through both the common treatment portions and to the noncommon treatment portions to separate the oil from the water.

The present invention is further premised upon the realization that the products which produce an oily effluent can be washed with a special detergent which can be destabilized. Subsequent destabilization of the oily effluent to break down the detergent, significantly improves the effectiveness of the oil water separation.

The present invention is further premised on the realization that by destabilizing the oily effluent during the common portion of the treatment provides sufficient time in the common portion of the treatment so that when the effluent is directed to the oil/water separator, the detergent is effectively destabilized.

This invention can be practiced both with laundries that use an effluent holding pit and those which do not have a separate effluent holding pit.

The present invention will be further appreciated in light of the following detailed description and drawings in which:

DETAILED DESCRIPTION

Figure 1:
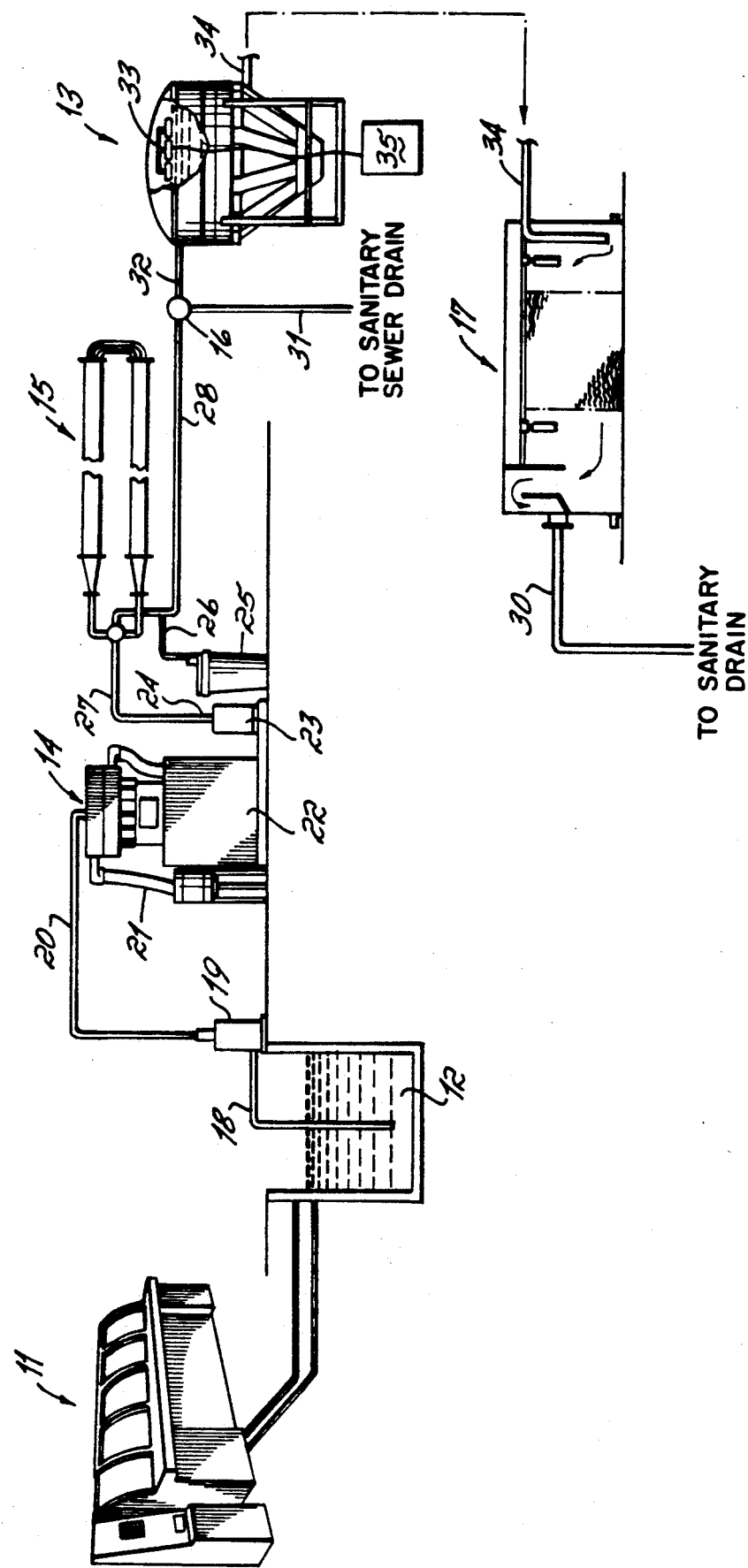
FIG. 1 is a diagrammatic view of the apparatus used in the present invention.

As shown in FIG. 1, the present invention incorporates an industrial washing apparatus 11 which directs its effluent to a holding tank or pit 12. The effluent is then directed to a suspended solid separator such as a shaker screen 14 and subsequently to a heat exchanger 15. The heat exchanger acts to draw out heat from the effluent. The water is then directed from heat exchanger 15 to a valve 16. The three-way valve 16 can act to either direct the effluent directly to a sanitary drain or a holding tank 13 and then to an oil/water separator 17. The oil/water separator and the holding tank with a floating weir will then effectively separate the oil from the effluent discharging a nonoily effluent to the sanitary drain.

More particularly, the washing apparatus 11 will direct all discharge into a holding pit 12. A diaphragm sump pump 19 sucks the effluent from pit 12 through pipe 18 and directs this through a pipe 20 to the shaker screen 14. Shaker screen 14 preferably has two or three decks and discs (not shown) which can effectively remove most of the suspended solids from the effluent.

As an example, the Midwestern Brand Gyra-Vib Separator which can have 80, 105 and 200 mesh screens will effectively separate the total suspended solids from the effluent. Other types of separators such as Thermal Engineering of Arizona will also function.

Shaker screen 14 incorporates sludge discharge chutes 21 for the removed solids. The remaining effluent water is discharged to a holding tank 22. The water in the holding tank 22 is then pumped through the discharge exit 24 to the heat exchanger 15. A chemical feed pump 25 is set up to pump, when necessary a chemical treatment agent via line 26 to line 28 as shown in FIG. 1.

The effluent from a diaphragm discharge pump 23 is directed to heat exchanger 15 which removes heat from the effluent. This removed heat is transferred to incoming cold clean wash water thereby effectively reducing energy costs. Heat exchangers are well known and generally part of most commercial laundries. The effluent from the heat exchanger 15 passes through discharge pipe 28 to the diverter valve 16.

The diverter valve 16 which is activated either manually or automatically from the wash room floor selectively directs the effluent to either the sanitary sewer drain through pipe 31 or to the oil/water surge tank 13 and then to the oil/water separator 17 via pipe 32. The oil/water separator as well as a floating weir 33 in the oil separator surge tank acts to enhance the oil to separate it from the water. The clean water is directed through pipe 30 to a sanitary drain and the oil is collected and discharged through pipe 34 and 35.

The oil/water separator 17 again can be purchased. Manufacturers of oil/water separators include Quantek, Inc. of Tulsa, Okla., Megator Corporation of Pittsburgh, Penn., Great Lakes Environmental Company of Addiston, Ill. and McTighe Industries Inc. of Mitchell, S. Dak. The capacity of the oil water separator 17 and the surge tank 13 should handle approximately one quarter to one third of the daily capacity of the laundry facility based upon average poundage of shop towels processed.

When washing articles which produce a nonoily effluent, the articles are washed using any conventional detergent and the water discharged to pit 12. This is then sucked up by the sump pump and directed to shaker screen 14 which filters out particulate material and directs these to solid sludge discharge 21. The aqueous hot effluent is then passed on to holding tank 22. Pump 23 then directs this hot effluent as required to the heat exchanger 15 which pulls or directs heat from the hot effluent.

Since this is a nonoily effluent, the chemical feed pump 25 is not activated and no treatment agent is added via line 26. The effluent directed from the heat exchanger 15 is then directed to diverter valve 16 via line 28. The shaker screen was sufficient to bring the effluent within the stated requirements of TSS, COD and BOD and accordingly the diverter valve 16 directs the effluent through line 31 to a sanitary drain.

When a dirty load of shop towels and the like, which is expected to produce an oily effluent, is washed, the articles are washed with a special detergent. This must be a detergent which has an emulsifier which can be easily broken down or destabilized. Suitable emulsifiers which can be treated chemically to destabilize them include the amphoteric emulsifiers in general such as pelargonic amphopropionate, capric/caprylic amphopropionate, sodium dioctyl sulfosuccinate which is an anionic detergent and Triton-RW sold by Rohm & Haas which is a polyethoxylate alkylamine. All of these can be destabilized by changing the pH from basic to acidic.

In addition to this, other materials can be added as destabilizing agents which are effective in most water oil emulsions. Such demulsifiers include the polyquaternary amines as well as generally cationic low molecular weight polymers and oligomers.

The following is a detergent composition which is particularly suitable for use in the present invention.

| Sodium Carbonate | 10.6% |
| Sodium Metasilicate | 66.7% |
| Tetrasodium Pyrophosphate | 9.2% |
| Silicon Dioxide-Amphorous | 2.5% |
| Nonylphenyl Ethoxylate (4-EO) | 9.0% |
| Pelargonic Amphopropionate | 2.0% |

This formula provides the ability to separate out oils and greases from waste water effluent when it is used as the only detergent in the system. This is best observed when the pH is adjusted to 3.0 to 6.0. If other conventional laundry detergents or cleaning additives are added to the laundry process, separation characteristics of the products are diminished if not eliminated.

When using the demulsifying detergent to wash shop towels and etc., the wash water flow will be as follows. Subsequent to wash, the effluent is directed to pit 12 and pumped to the shaker screen 14 by sump pump 19. This, as with the nonoily effluent, separates the solids and discharges the aqueous effluent into the holding tank 22. Pump 23 acts to direct this aqueous effluent to the heat exchanger 15 through discharge 24. As the effluent is being directed through discharge 24, the chemical feed pump 25 is activated to direct chemical treatment agent through line 26 to the discharge 28 thus mixing the chemical treatment agent with the effluent.

Preferably the chemical treatment agent will be an acid such as sulfuric acid. Pump 25 will act to provide sufficient acid to the effluent to lower the pH to about 3-6 preferably about 5.

After the effluent passes through the discharge 24 and pipe 27 and subsequently heat exchanger 15, the effluent mixes with this chemical treatment agent in pipe 28 so that by the time the effluent reaches the diverter valve 16 there is relatively good mixing of the effluent with the treatment agent. If pipe 28 is not sufficiently long, an inline mixer can be installed to assure proper mixing of the chemical agents. Since this is an oily effluent, the effluent is directed through pipe 32 to the oil separator surge tank 13 and then to the oil/water separator 17. The demulsified oil will start to separate in the oil separator surge tank 13 and that portion is skimmed off by the floating oil skimmer 33. The oily effluent then flows to the oil water separator 17 where the oil will rise to the top and be skimmed off or be collected by some other conventional oil collector and the relatively oil free water will be directed through pipe 30 to the sanitary drain. Solids remaining in the water prior to being discharged in the sanitary drain will fall to the bottom of the oil/water separator where they will be removed by blow-down.

The apparatus of the present invention is preferably designed so that the diverter valve is concurrently activated with the chemical feed pump 25.

This invention works where the laundry schedules its production so that all the shop towels, mops, fender covers and very oil coveralls are processed at a separate time from garments. This must be done so that the effluent from processing garments does not mix with the effluent from processing shop towels, etc., as the detergent systems are totally different.

This invention can also be utilized when the laundry has separate facilities for processing shop towels and mops, or wash wheels having dual trenches, or pit and shaker screen where shop towels, mops, fender covers and other oily items are processed. It can also be utilized where a laundry has additional trenches or soil line and pits to separate the garment effluent from the shop and mop effluent. In this case, thru the use of a float switch or probe, in the oil water pit the oily effluent will be the preferential treatment thru the shaker screen 13 and other equipment with the non oily water being held in its own pit 12 until the oily water has been emptied from the wastewater feed tank.

Figure 2:
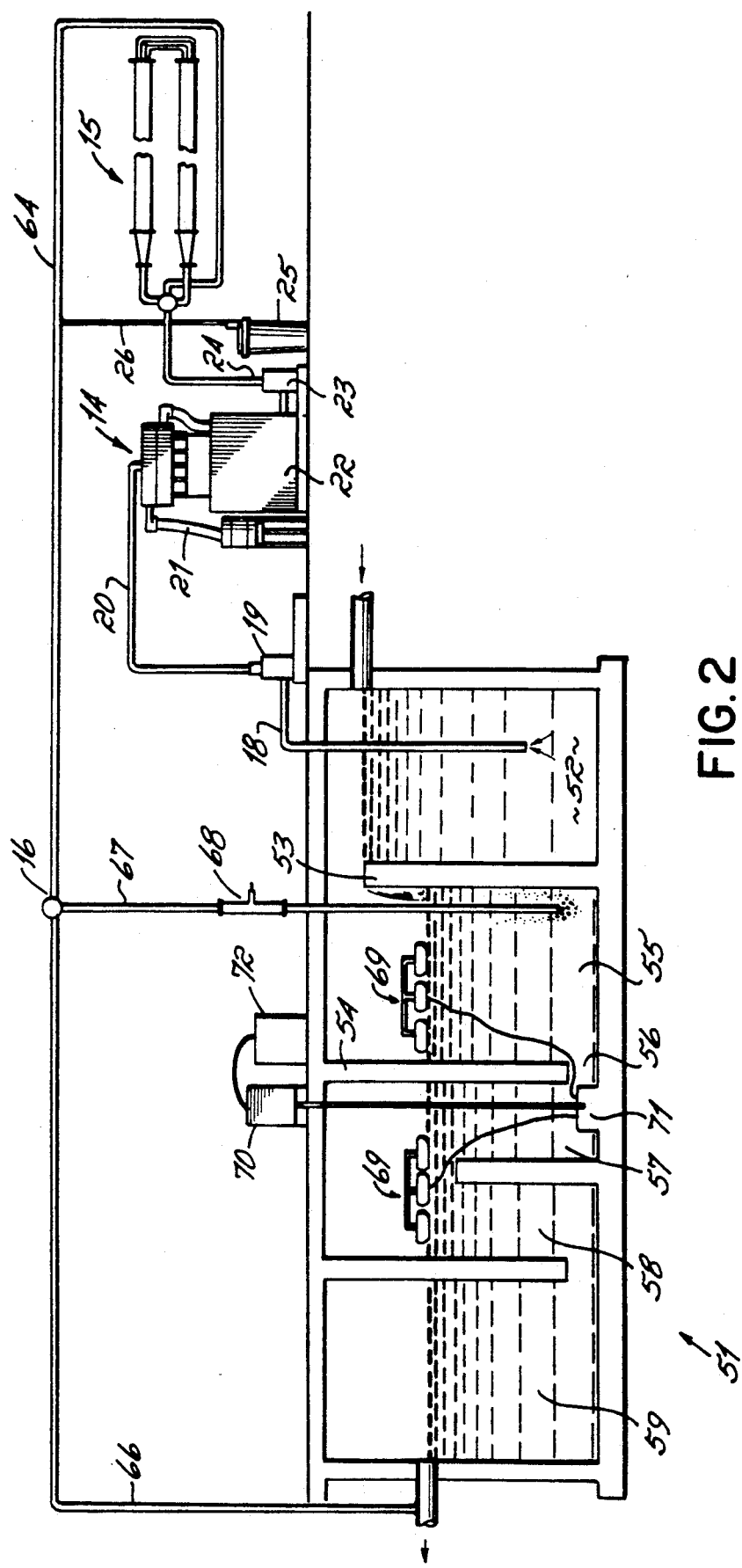
FIG. 2 is a diagrammatic depiction of an alternate embodiment of the present invention.

As shown in FIG. 2, many laundry facilities include a segregated holding tank 51. This holding tank actually is a plurality of tanks. It incorporates a first holding tank 52 which is separated from the remaining tank by a first divider 53. A second divider 54 defines the oil effluent pit 55. Divider 54 extends from the top of the container down towards the bottom leaving a passage 56 in the bottom of the tank which permits the water to flow to additional holding tanks 57, 58 and 59 for further separation if needed.

This apparatus functions basically in the same way as the apparatus shown in FIG. 1. The effluent from the wash isle is directed from pit 52 up inlet pipe 18 to the sump pump 19 and the shaker screen 14 and past feed pump 23 through heat exchanger 15 through pipe 64 to the diverter valve 16.

The diverter valve 16 can either direct the effluent, if it is nonoily effluent, through discharge pipe 66 to the sanitary sewer or can direct it through discharge line 67 to the oil pit 55. An air injector 68 can also be incorporated in line 67 to assist oil separation.

This directs the oily effluent to pit 55. As the oily effluent becomes tranquil in pit 55 the oil separates from the water and rises to the top where it is collected by the floating oil skimmer 69. Relatively clean and oil free water will then pass through the passage 56 at the bottom of the separating pit into subsequent treatment pits where additional oil can rise or where standard treatment can be applied if necessary for example, to remove metals and the like.

An oil suction pump 70 pulls the oil from oil sump 71 and into a tramp oil container 72 for disposal. The floating oil skimmers are manufactured by Megatok Corporation. Other separators such as rope or belt skimmers can be employed.

The embodiments shown in both FIGS. 1 and 2 provide many different advantages. The primary advantage is that the cost of treating the effluent is substantially reduced by using both a common treatment portion and a noncommon treatment portion. The common treatment portion, the shaker screen, removes suspended solids, thus lowering the BOD and COD of the effluent However, even the nonoily effluent requires this treatment. Thus, the sizing of the this apparatus must be such that it can accommodate all effluent from the industrial laundry. But since only a small portion of the effluent requires additional treatment, the cost of treatment can be substantially reduced by having a noncommon treatment apparatus which is used only for oily effluent. This enables the size of this unit to be reduced to one-fourth to one-third of the size required to treat all the effluent from the laundry in turn reducing the cost even more.

By alternately cleaning oily and nonoily articles, the oily effluent can remain in the oil water surge tank or separator for a sufficient time to permit adequate treatment. Use of a special detergent which can be broken down by chemical treatment, further facilitates treatment of the oily effluent. Particularly adding a chemical treatment agent during the common treatment portion permits the effluent to mix with the treatment agent so that by the time it reaches the noncommon oil separator it effectively has mixed and deactivated or destabilized the detergent.

The preceding has been a description of the present invention as well as a preferred method of practicing the invention. However, the invention should only be defined by the appended claims wherein

We claim:

1. A method of separately laundering oily fabric and nonoily fabric in a laundering apparatus and subsequently treating the effluent from the laundering apparatus wherein the effluent is alternately an oily aqueous effluent containing a destabilizable emulsifier created by washing said oily fabric and a nonoily aqueous effluent produced by washing said nonoily fabric said method comprising;
    directing said oily effluent through a particulate filter and to an oil water separator and separating oil and water from said oily effluent and directing said water to a sewer system and collecting said oil wherein an emulsion destabilizing agent is added to said oily effluent to break down said destabilizable emulsifier prior to directing said effluent to said oil water separator;
    directing said nonoily effluent through said particulate filter;
    and directing said nonoily effluent to a sewer system without directing said nonoily effluent to said oil water separator.

2. The method claimed in claim 1 wherein said oily effluent is directed through a heat exchanger immediately upstream of the oil water separator and wherein said nonoily effluent is directed through said heat exchanger.

3. The method claimed in claim 1 wherein said oily effluent is produced by washing oily fabric with a detergent having a destabilizable emulsifier;
    and said emulsion destabilizer is not added to said nonoily effluent.

4. The method claimed in claim 3 wherein said destabilizable emulsifier is a pH, destabilizable emulsifier and wherein said emulsion destabilizing agent is an acid.

5. The method claimed in claim 3 wherein said emulsion destabilizing agent is selected from the group consisting essentially of sulfuric acid.

6. A method of treating aqueous effluent from laundry where said effluent is alternately an aqueous heated oily effluent having a pH sensitive oil emulsifier and an aqueous heated nonoily effluent said method comprising directing said oily effluent through a particulate filter and a heat exchanger;
    adding a pH adjusting substance to said oily effluent effective to break down said pH sensitive emulsifier;
    directing said oily effluent to an oil water separator and separating oil and water from said oily effluent and directing said water to a sewer system and collecting said oil;
    directing said nonoily effluent through said particulate filter and said heat exchanger and directing said nonoily effluent to a sewer system without directing said nonoily effluent to said oil water separator.

7. A method of separately laundering oily fabric and nonoily fabric in a laundering apparatus and subsequently treating the effluent from the laundering apparatus wherein the effluent is alternately an oily aqueous effluent containing a destabilizable emulsion created by washing said oily fabric and a nonoily aqueous effluent produced by washing said nonoily fabric said method comprising:
    adding an emulsion destabilizing agent to said oily effluent to break down said emulsifier prior to directing said effluent to an oil/water separator;
    directing said oily effluent through a particulate filter and to an oil water separator and separating oil and water from said oily effluent and directing said water to a sewer system and collecting said oil;
    directing said nonoily effluent through said particulate filter;
    and directing said nonoily effluent to a sewer system without adding acid thereto and without directing said nonoily effluent to said oil/water separator.

* * * * *